(12) United States Patent
Runstedler et al.

(10) Patent No.: US 9,098,835 B2
(45) Date of Patent: Aug. 4, 2015

(54) METHOD AND APPARATUS FOR UPDATING FLAG DATA OF ASSOCIATED MESSAGES

(75) Inventors: Christopher James Runstedler, Cambridge (CA); Robert John Edwards, Waterloo (CA); Aaron David Scriver, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 885 days.

(21) Appl. No.: 12/649,439

(22) Filed: Dec. 30, 2009

(65) Prior Publication Data

US 2011/0161832 A1    Jun. 30, 2011

(51) Int. Cl.
*G06Q 10/10* (2012.01)
*H04L 12/58* (2006.01)

(52) U.S. Cl.
CPC .............. *G06Q 10/107* (2013.01); *H04L 51/16* (2013.01); *H04L 51/22* (2013.01); *H04L 51/26* (2013.01)

(58) Field of Classification Search
CPC .... G06Q 10/107; H04L 12/586; H04L 51/22; H04L 51/26
USPC ................................ 715/852, 752; 709/207
See application file for complete search history.

(56) References Cited

U.S. PATENT DOCUMENTS

| 6,055,413 | A  * | 4/2000  | Morse et al. ................. | 340/7.43 |
| 6,212,553 | B1 * | 4/2001  | Lee et al. ...................... | 709/206 |
| 6,330,589 | B1 * | 12/2001 | Kennedy ....................... | 709/206 |
| 7,421,690 | B2 * | 9/2008  | Forstall et al. ................ | 718/100 |
| 7,472,357 | B1 * | 12/2008 | Satterfield et al. ............ | 715/859 |
| 7,716,593 | B2 * | 5/2010  | Durazo et al. ................. | 715/752 |
| 7,752,279 | B2 * | 7/2010  | Hardy et al. .................. | 709/207 |
| 7,941,492 | B2 * | 5/2011  | Pearson et al. ................ | 709/206 |
| 8,037,146 | B2 * | 10/2011 | Carr et al. ..................... | 709/206 |
| 8,402,096 | B2 * | 3/2013  | Affronti et al. ............... | 709/206 |
| 2004/0260756 | A1 | 12/2004 | Forstall et al. | |

(Continued)

FOREIGN PATENT DOCUMENTS

EP    1785923 A1    5/2007

OTHER PUBLICATIONS

Webopedia, "What is flag?—A Word Definition From the Webopedia Computer Dictionary," Nov. 3, 2008, Available https://web.archive.org/web/20081103222110/http://www.webopedia.com/TERM/F/flag.html.*

(Continued)

*Primary Examiner* — Alvin Tan
(74) *Attorney, Agent, or Firm* — Perry + Currier, Inc.

(57) ABSTRACT

A method and apparatus for a method for processing data on a computing device are provided. The computing device comprises a processing unit interconnected with a memory device and a display device. First message data is stored in the memory device. An indication that first flag data is to be stored in association with the first message data is received. The first flag data is stored in the memory device in association with the first message data. The first message is displayed in association with the first flag data at the display device in a message list view. Second message data is received and automatically associated with the first message data. In response to the automatic associating: the first flag data is removed from the display device; second flag data is stored in association with the second message data in the memory device and the second message data is displayed on the display device in association with the second flag data in the message list view, the second message data flagged on the display device rather than the first message data.

11 Claims, 8 Drawing Sheets

(56) References Cited

U.S. PATENT DOCUMENTS

2006/0271630 A1 11/2006 Bensky et al.
2008/0126951 A1* 5/2008 Sood et al. .................... 715/752
2008/0235335 A1* 9/2008 Hintermeister et al. ...... 709/206
2008/0270547 A1* 10/2008 Glickstien et al. ............ 709/206

OTHER PUBLICATIONS

European Patent Application No. 09180971.5 Search Report dated Apr. 23, 2010.

European Patent Application No. 09 180 971.5 Examination Report dated Dec. 27, 2011.

Google Mail—Gmail Help, downloaded from http://mail.google.com/support/bin/answer.py?hl=en&answer=156812 Aug. 27, 2009.

Meet Postbox, downloaded from http://www.postbox-inc.com/features Aug. 27, 2009.

Flag Star Messages—Postbox, downloaded from http://getsatisfaction.com/postbox/topics/flag_star_messages Aug. 27, 2009.

Track e-mail messages that require follow up downloaded from http://office.microsoft.com/en-us/outlook/HA012299011033.aspx#7 Sep. 16, 2009.

* cited by examiner

| REPLY | REPLY TO ALL | FORWARD | | | |
|---|---|---|---|---|---|
| INBOX | | | | | |
| FROM | | SUBJECT | | RECEIVED | FLAG |
| Cathy Johannson | | Message from CEO | | Mon 30/11/2009 10:13 | |
| Paul Smith | | Vacation Request | | Mon 30/11/2009 10:10 | |
| Nancy Spence | | Patent Meeting | | Mon 30/11/2009 09:22 | |
| Bill Johnson | | November's Sales | | Mon 30/11/2009 09:20 | |
| Ed Jones | | Sales Meeting | | Mon 30/11/2009 09:02 | ▷ |

Messaging Application Header

Fig. 2

| REPLY | REPLY TO ALL | FORWARD |

INBOX

| FROM | SUBJECT | RECEIVED | FLAG |
|---|---|---|---|
| Ed Jones | Re: Sales Meeting | Mon 30/11/2009 11:12 | ▷ |
| Cathy Johannson | Message from CEO | Mon 30/11/2009 10:13 | |
| Paul Smith | Vacation Request | Mon 30/11/2009 10:10 | |
| Nancy Spence | Patent Meeting | Mon 30/11/2009 09:22 | |
| Bill Johnson | November's Sales | Mon 30/11/2009 09:20 | |
| Ed Jones | Sales Meeting | Mon 30/11/2009 09:02 | |

Messaging Application Header

Fig. 4

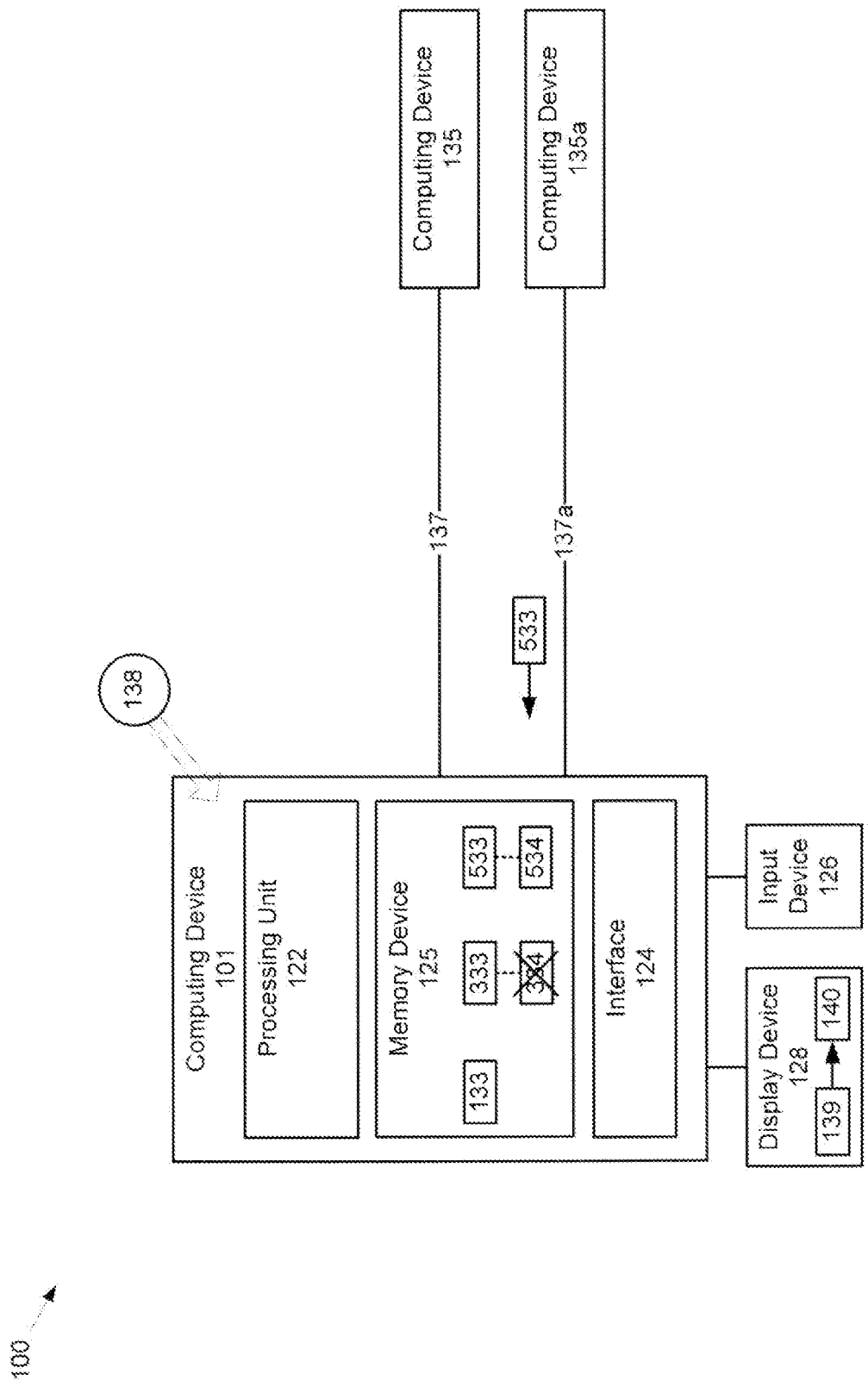

| | Messaging Application Header | | |
|---|---|---|---|
| REPLY | REPLY TO ALL | FORWARD | |
| INBOX | | | |
| FROM | SUBJECT | RECEIVED | FLAG |
| Nancy Spence | Re: Re: Sales Meeting | Mon 30/11/2009 13:02 | ▷ |
| Paul Smith | Re: Patent Meeting | Mon 30/11/2009 12:20 | |
| Ed Jones | Re: Sales Meeting | Mon 30/11/2009 11:12 | |
| Cathy Johannson | Message from CEO | Mon 30/11/2009 10:13 | |
| Paul Smith | Vacation Request | Mon 30/11/2009 10:10 | |
| Nancy Spence | Patent Meeting | Mon 30/11/2009 09:22 | |
| Bill Johnson | November's Sales | Mon 30/11/2009 09:20 | |
| Ed Jones | Sales Meeting | Mon 30/11/2009 09:02 | |

| REPLY | REPLY TO ALL | FORWARD | | | |
|---|---|---|---|---|---|
| INBOX | | | | | |
| FROM | | SUBJECT | | RECEIVED | FLAG |
| Nancy Spence | | Re: Re: Sales Meeting | | Mon 30/11/2009 13:02 | ⚑ 713b |
| Paul Smith | | R... There is a later message in this thread. Flag Moved. [OK] 720 | | Mon 30/11/2009 12:20 | |
| Ed Jones | | | | Mon 30/11/2009 11:12 | |
| Cathy Johannson | | M... | | Mon 30/11/2009 10:13 | |
| Paul Smith | | Vacation Request | | Mon 30/11/2009 10:10 | |
| Nancy Spence | | Patent Meeting | | Mon 30/11/2009 09:22 | |
| Bill Johnson | | November's Sales | | Mon 30/11/2009 09:20 | |
| Ed Jones | | Sales Meeting | | Mon 30/11/2009 09:02 | ⚑ 713a |

Messaging Application Header

METHOD AND APPARATUS FOR UPDATING FLAG DATA OF ASSOCIATED MESSAGES

FIELD

The specification relates generally to computing devices, and specifically to a method and apparatus for processing data on a computing device.

BACKGROUND

When a message is flagged for follow up in a message list view of a messaging application, associated messages (e.g. replies, follow-up messages etc.) often arrive before the original message is followed up/processed (e.g. viewed/replied to). Hence, the entire list of messages must be scanned to try to find the most recent message in the thread, thus reducing the value of flag for follow up, and increasing the amount of computing resources used in following up the original message.

BRIEF DESCRIPTIONS OF THE DRAWINGS

Embodiments are described with reference to the following figures, in which:

FIG. 2 depicts a representation of a messaging application, according to non-limiting embodiments;

FIG. 4 depicts a representation of a messaging application, according to non-limiting embodiments;

FIG. 5 depicts a block diagram of a system including a computing device for processing data, according to non-limiting embodiments;

FIG. 6 depicts a representation of a messaging application, according to non-limiting embodiments;

FIG. 7 depicts a representation of a messaging application, according to non-limiting embodiments.

DETAILED DESCRIPTION OF THE EMBODIMENTS

Figure 1:
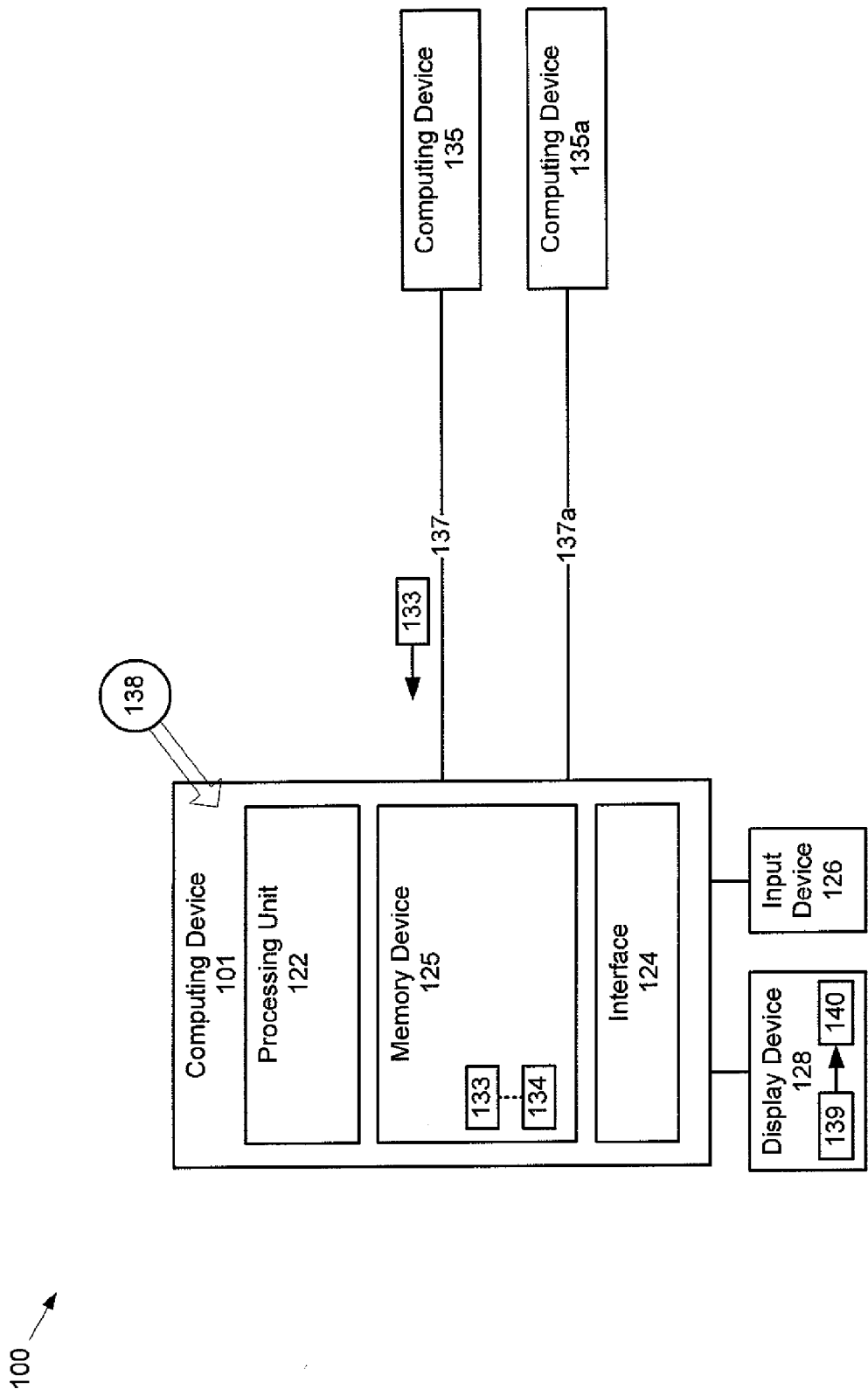
FIG. 1 depicts a block diagram of a system including a computing device for processing data, according to non-limiting embodiments.

A first aspect of the specification provides a method for processing data on a computing device, the computing device comprising a processing unit interconnected with a memory device and a display device. The method comprises storing first message data in the memory device. The method further comprises receiving an indication that first flag data is to be stored in association with the first message data. The method further comprises storing the first flag data in the memory device in association with the first message data. The method further comprises displaying the first message data in association with the first flag data at the display device in a message list view. The method further comprises receiving, at the processing unit, second message data. The method further comprises automatically associating the second message data with the first message data. The method further comprises, in response to the automatic associating: removing the first flag data from the display device; and, storing second flag data in association with the second message data in the memory device and displaying the second message data on the display device in association with the second flag data in the message list view, the second message data flagged on the display device rather than the first message data.

Displaying the first message in association with the first flag data at the display device in the message list view can comprise displaying a representation of the first message data in association with a representation of the first flag data on the display device in the message list view such that the first message data is flagged in the message list view prior to the receiving the second message data. Removing the first flag data from the display device can comprise deleting the representation of the first flag data in the message list view. Displaying the second message data on the display device in association with the second flag data in the message list view can comprise displaying a representation of the second message data in association with a representation of the second flag data on the display device in the message list view, such that the second message data is flagged in the message list view.

Automatically associating the second message data with the first message data can comprise at least one of: determining that each of the first message data and the second message data each comprise similar subject data; determining that the second message data comprises at least a portion of the first message data; determining that each of the first message data and the second message data each comprise related metadata; and determining that each of the first message data and the second message data belong to the same message thread.

The method can further comprise: receiving further message data; automatically associating the further message data with the first message data; and in response to automatically associating the further message data with the first message data, removing any existing flag data associated with any message data associated with the first message data from the display device; and storing further flag data in association with the further message data in the memory device and displaying the further message data on the display device in association with the further flag data in the message list view, the further message data flagged on the display device rather than the any other message data.

The method can further comprise synchronizing message data and flag data with a second computing device.

The computing device can comprise a portable electronic device.

A first aspect of the specification provides a computing device for processing data. The computing device comprises a processing unit interconnected with a memory device, a display device, and a communication interface. The processing unit enabled to: store first message data in the memory device; receive an indication that first flag data is to be stored in association with the first message data; store the first flag data in the memory device in association with the first message data; control the display device to display the first message data in association with the first flag data in a message list view; receive second message data via the communication interface; automatically associate the second message data with the first message data; and, in response to the automatic associating: remove the first flag data from the display device; and store second flag data in association with the second message data in the memory device and display the second message data on the display device in association with the second flag data in the message list view, the second message data flagged on the display device rather than the first message data.

To display the first message in association with the first flag data at the display device in the message list view the processing unit can be further enabled to control the display device to display a representation of the first message data in association with a representation of the first flag data in the message list view such that the first message data is flagged in the message list view prior to the receiving the second message data. To remove the first flag data from the display device the processing unit can be further enabled to delete the representation of the first flag data in the message list view. To display the second message data on the display device in association with the second flag data in the message list view the processing unit can be further enabled to control the display device to display a representation of the second message data in association with a representation of the second flag data in the message list view, such that the second message data is flagged in the message list view.

To automatically associate the second message data with the first message data, the processing unit can be further enabled to at least one of: determine that each of the first message data and the second message data each comprise similar subject data; determine that the second message data comprises at least a portion of the first message data; determine that each of the first message data and the second message data each comprise related metadata; and determine that each of the first message data and the second message data belong to the same message thread.

The processing unit can be further enabled to: receive further message data; automatically associate the further message data with the first message data; and in response to the automatic association of the further message data with the first message data, remove any existing flag data associated with any message data associated with the first message data from the display device; and store further flag data in association with the further message data in the memory device and control the display device to display the further message data in association with the further flag data in the message list view, the further message data flagged on the display device rather than the any other message data.

The processing unit can be further enabled to synchronize message data and flag data with a second computing device.

The computing device can comprise a portable electronic device.

A third aspect of the specification provides a computer program product, comprising a computer usable medium having a computer readable program code adapted to be executed to implement a method for processing data on a computing device. The computing device comprises a processing unit interconnected with a memory device and a display device. The method comprises: storing first message data in the memory device; receiving an indication that first flag data is to be stored in association with the first message data; storing the first flag data in the memory device in association with the first message data; displaying the first message in association with the first flag data at the display device in a message list view; receiving, at the processing unit, second message data; automatically associating the second message data with the first message data; and, in response to the automatic associating: removing the first flag data from the display device; and, storing second flag data in association with the second message data in the memory device and displaying the second message data on the display device in association with the second flag data in the message list view, the second message data flagged on the display device rather than the first message data.

FIG. 1 depicts a system 100 comprising a computing device 101 for processing data. Computing device 101 generally comprising a processing unit 122 interconnected with a memory device 125, an input device 126 and a display device 128. As depicted, input device 126 and display device 128 are external to computing device 101, however in other embodiments, computing device 101 can comprise input device 126 and display device 128. Memory device 125 stores first message data 130 in association with first flag data 134 such that first message data 133 can be displayed on display device 128 in association with first flag data 134 in a message list view. Message data 133 can be received from a second computing device 135 via a link 137, for example an e-mail or the like. In some embodiments, system 100 can further comprise at least a third computing device 135a, in communication with computing device 101 via a link 137a. In some embodiments, message data 133 can also be transmitted to computing device 135a from computing device 135 (e.g. via a link there between, not depicted), when the message data 133 is intended for multiple recipients.

In any event, once message data 133 is received at computing device 101, message data 133 is stored in memory device 125. Further, message data 133 can be displayed via a messaging application 138 at computing device 101 (which can be stored in memory device 125 and processed by processing unit 122). Upon processing messaging application 138, processing unit 122 can control circuitry 139 in display device 128 to provide a representation 140 of messaging application 138 as depicted in FIG. 2.

From FIG. 2 it is understood that representation 140 of messaging application 138 comprises a representation 201 of an "INBOX" for providing indications of message data in a message list view, such as message data 133. For example, representation 201 comprises a list of message data received from, as indicated in a field 203 ("FROM"), on various subjects, as indicated in a field 205 ("SUBJECT"), as well a field 207 for indicating when the message data was received ("RECEIVED"). It is understood that further message data, such as a body of an e-mail, can be provided in representation 140 when input data is received indicating that a given set of message data has been chosen for opening (e.g. a message in the list in representation 201 is clicked on using a pointing device).

Representation 201 further comprises a field 209 for indicating whether a given set of message data is flagged ("FLAG"): an indication can be received indicating that a given set of message data is flagged. For example, the indication can comprise input data from input device 126. In any event, if a given set of message data is flagged, processing unit 122 causes an icon 213 to be displayed in field 209. Furthermore, first flag data 134 is stored in memory device 125 in association with the flagged message data (e.g. message data 133). In some embodiments icon 213 can comprise a representation of a flag, as depicted, though it is understood that the shape of icon 213 is generally non-limiting. In exemplary non-limiting embodiments, message data 133 can comprise the last set of message data represented by the last line 211 in the list of representation 201, e.g. the message from "Ed Jones" regarding a "Sales Meeting", received on Monday Nov. 30, 2009 at 09:02. Hence, it is understood that computing device 135 can be associated with "Ed Jones". In the exemplary embodiments, input data has been received from input device 126 indicative that the field 209 in line 211 has been selected, and icon 213 is then provided indicating that message data 133 has been flagged for follow-up, for example at a later time. Hence first flag data 134 is then stored in memory device 125 in association with message data 133.

It is understood that representation 140 of messaging application 138 can further comprise a header 215 and virtual buttons 217, 219, 221 which, when actuated, can cause processing unit 122 to respectively initiate a "REPLY", a "REPLY TO ALL", or a "FORWARD" to/of a highlighted message in the list of representation 201.

Figure 3:
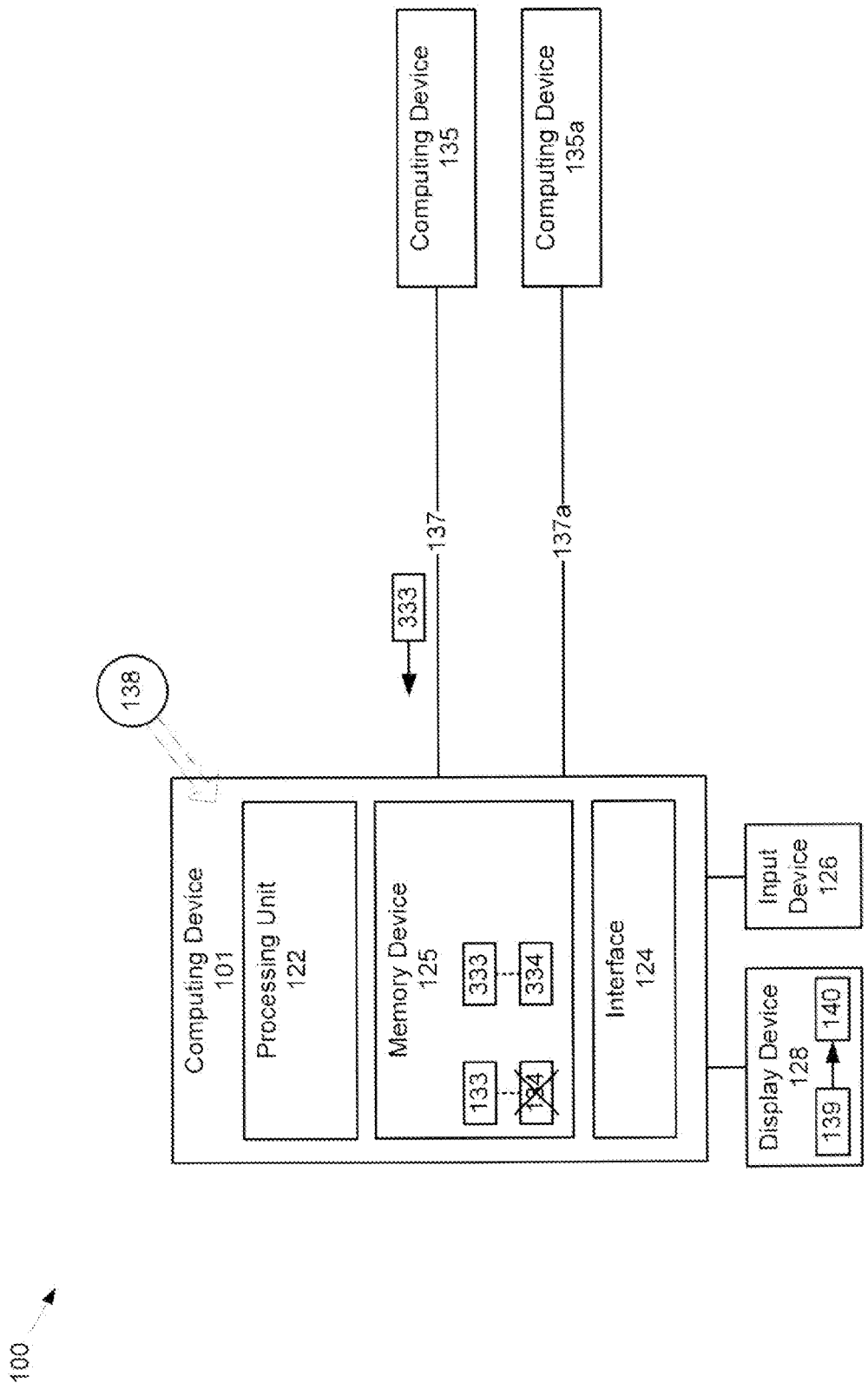
FIG. 3 depicts a block diagram of a system including a computing device for processing data, according to non-limiting embodiments.

Attention is now directed to FIG. 3, which is substantially similar to FIG. 1, with like elements having like numbers. In FIG. 3 however second message data 333 is received at computing device 101 from second computing device 135. Processing unit 122 can automatically determine that second message data 333 is associated with first message data 133. For example second message data 333 can comprise a reply to all message initiated at second computing device 135 and/or as an update to first message data 133. Second message data 333 is stored in memory device 125.

In any event, representation 140 is then updated as depicted in FIG. 4, substantially similar to FIG. 2, with like elements having like numbers. Specifically, it is understood that the list of messages in representation 201 is updated to include a new line 311 comprising an indication of a new message from "Ed Jones"; an association with the message in line 211 is indicated in field 205 of line 311 as subject data for each message are similar, subject data of the message of line 211 comprising "Sales Meeting" and subject data of the message of line 311 comprising "Re: Sales Meeting". In general, it is understood that given prefixes such as "Re:", "FWD:" and the like can be ignored when comparing subject data. Hence, processing unit 122 can automatically determine that second message data 333 is associated with first message data 133 as each comprises similar subject data. In other embodiments, associations between message data can be automatically determined by processing unit 122 from data in a body of the message data (e.g. second message data 333 can comprise at least a portion of message data 133) and/or related meta-data associated with each set of message data.

In any event, in FIG. 4, icon 213 is no longer provided in field 209 of line 211; rather icon 213 is removed from display device 128 and an icon 413, similar to icon 213, is provided in field 209 of line 311, indicating that line 311 is indicative of the latest message data in the thread previously flagged as in FIG. 2. Hence, the flagging of message data is updated to flag only the most recent message in a thread so that time and computing resources are not wasted in finding the most recent message associated with a message that was previously flagged.

Furthermore, returning to FIG. 3, it is understood that when second message data 333 associated with first message data 133 is received at computing device 101, second flag data 334 is stored in memory device 125 in association with second message data 333. In some embodiments, first flag data 134 can be deleted from memory device 125. Any deletion of first flag data 134 and storing of second flag data 334 can occur independent of displaying representation 140, for example before display device 128 is controlled to provided representation 140.

Present embodiments can be further understood with reference to FIGS. 5 and 6, respectively similar to FIGS. 3 and 4, with like elements having like numbers. In these embodiments, as depicted in FIG. 5, further message data 533 associated with first message data 133 is received at computing device 101 from computing device 135a. Processing unit 122 automatically determines that further message data 533 is associated with first message data 133. (e.g. determined by comparing subjects, and/or further message data 533 comprises at least a portion of first message data 133 and/or related metadata). Any existing flag data associated with any message data associated with first message data 133 is removed from display device 128, for example second flag data 334 and/or icon 213. Further flag data 534 is then stored in association with further message data 533 in memory device 125 such that further message data 533 can be displayed on display device 128 in association with further flag data 534 in the message list view, further message data 533 flagged on display device 128 rather than any other message data in the same thread. Further message data 533 can comprise a reply to all message initiated at third computing device 135a in response to first message data 133, or a forwarded message (e.g. third computing device 135a also receives first message data 133 and hence can reply to and/or forward first message data 133).

In any event, representation 140 is then updated as depicted in FIG. 6. Specifically, it is understood that the list of messages in representation 201 is updated to include a new line 611 comprising an indication of a new message from "Nancy Spence", who is associated with third computing device 135a; an association with the message in line 211 is indicated in field 205 of line 611 as subject data for each message are similar, subject data of the message of line 211 comprising "Sales Meeting" and subject data of the message of line 311 comprising "Re: Re: Sales Meeting". Furthermore, in FIG. 6, icon 413 is no longer provided in field 209 of line 311 as in FIG. 4; rather an icon 613, similar to icon 213, is provided in field 209 of line 611, indicating that line 611 is indicative of the latest message data in the thread previously flagged as in FIG. 2. Hence, the flagging of message data is again updated to flag only the most recent message in a thread so that time and computing resources are not wasted in finding the most recent message associated with a message that was previously flagged.

Indeed, updating of the flagging of the most recent message in a thread can continue indefinitely and/or until the feature is disabled via interaction with a user menu associated with message application 138. Indeed, the feature can be turned on or off via interaction with such a user menu.

Furthermore, it is understood from FIG. 6 that other message data can be received between receiving message data associated with first message data 133. While not depicted, it is also understood that other message data can be stored in memory device 125, and that that other message data can be respectively associated with other flag data, similar to first message data 133. Hence, only the most recent message in a thread can be flagged when an earlier message in the thread was previously flagged.

Consider now embodiments where at least two associated sets of message data are stored in memory device 125, including earlier received message data and later received message data. For example, the at least two associated sets of message data can comprise an initial message, replies, replies to all, etc. However, none of the at least two associated sets of message data are initially associated with flag data. In some of these embodiments, when message data is displayed in representation 140 and a flag is set on an earlier message, processing unit 122 can then determine that an associated later-received message data is stored in memory device 125 and "move" the flag from the earlier message data to the later-received message.

For example, attention is directed to FIG. 7, substantially similar to FIG. 6, with like elements having like numbers. In these embodiments, icon 713a (similar to icon 213) is provided in field 209 of line 211 when message data represented by line 211 is flagged, and flag data is stored in memory device 125 in association with the message data. However, processing unit 122 then determines that representation 201 includes associated messages, and icon 713a is removed/deleted, and a similar icon 713b is then provided in field 209 of line 611 (skipping line 311). A notifier 720 of a flag being moved and a later message in the thread can also be provided with an option ("OK") to dismiss the notifier.

Returning now to FIG. 1, it is understood that links 137, 137a can comprise any suitable combination of wired and wireless links desired, such that computing device 101 can communicate with computing devices 135, 135a. Hence, links 137, 137a can comprise any suitable wired or wireless communication network, including but not limited to packet based networks, the internet, a local area network (LAN), a wireless local area network (WLAN), a wide area network (WAN), analog networks, the PSTN (public switched telephone network), cell-phone networks (including but not limited to CDMA (Code division multiple access), GSM (Global System for Mobile communications), UMTS (Universal Mobile Telecommunications System), 1X, Edge and the like), WiFi and WiMax networks.

In general, computing devices 101, 135, 135a comprises any suitable computing device for communicating with there between, including but not limited to any suitable combination of personal computers, laptop computing devices, portable computing devices, personal digital assistants (PDA), wireless communication devices, wireless computing devices, portable electronic devices, and the like. Other suitable computing devices are within the scope of present embodiments. Furthermore, each computing device 135, 135a can be similar or different to each other and/or computing device 101.

Processing unit 122 comprises any suitable processor, or combination of processors, including but not limited to a microprocessor. a central processing unit (CPU) and the like. Other suitable processing units are within the scope of present embodiments. In particular, processing unit 122 is enabled to process messaging application 138 which can be stored in memory device 125.

Communication interface 124 comprises any suitable wired and/or wireless communication interface, or combination of communication interfaces, enabled to communicate with computing devices 135, 135a via links 137, 137a. Accordingly, communication interface 124 is enabled to communicate according to any suitable protocol compatible with links 137, 137a, including but not limited to wired protocols, wireless protocols, cell-phone protocols, wireless data protocols, packet based protocols, Internet protocols, analog protocols, PSTN protocols, cell phone protocols, WiFi protocols, WiMax protocols and the like, and/or a combination. Other suitable communication interfaces and/or protocols are within the scope of present embodiments.

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present embodiments.

Memory device 125 can comprise any suitable memory device, including but not limited to any suitable one of or combination of volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present embodiments. In particular, memory device 125 is enabled to store message data 133, 333, 533 and flag data 134, 334, 534, as well as messaging application 134.

Display device 128 comprises circuitry 139 for generating representations of data, for example representation 140 of messaging application 140. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 139 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 139 can be controlled by processing unit 122 to generate representation 140.

Figure 8:
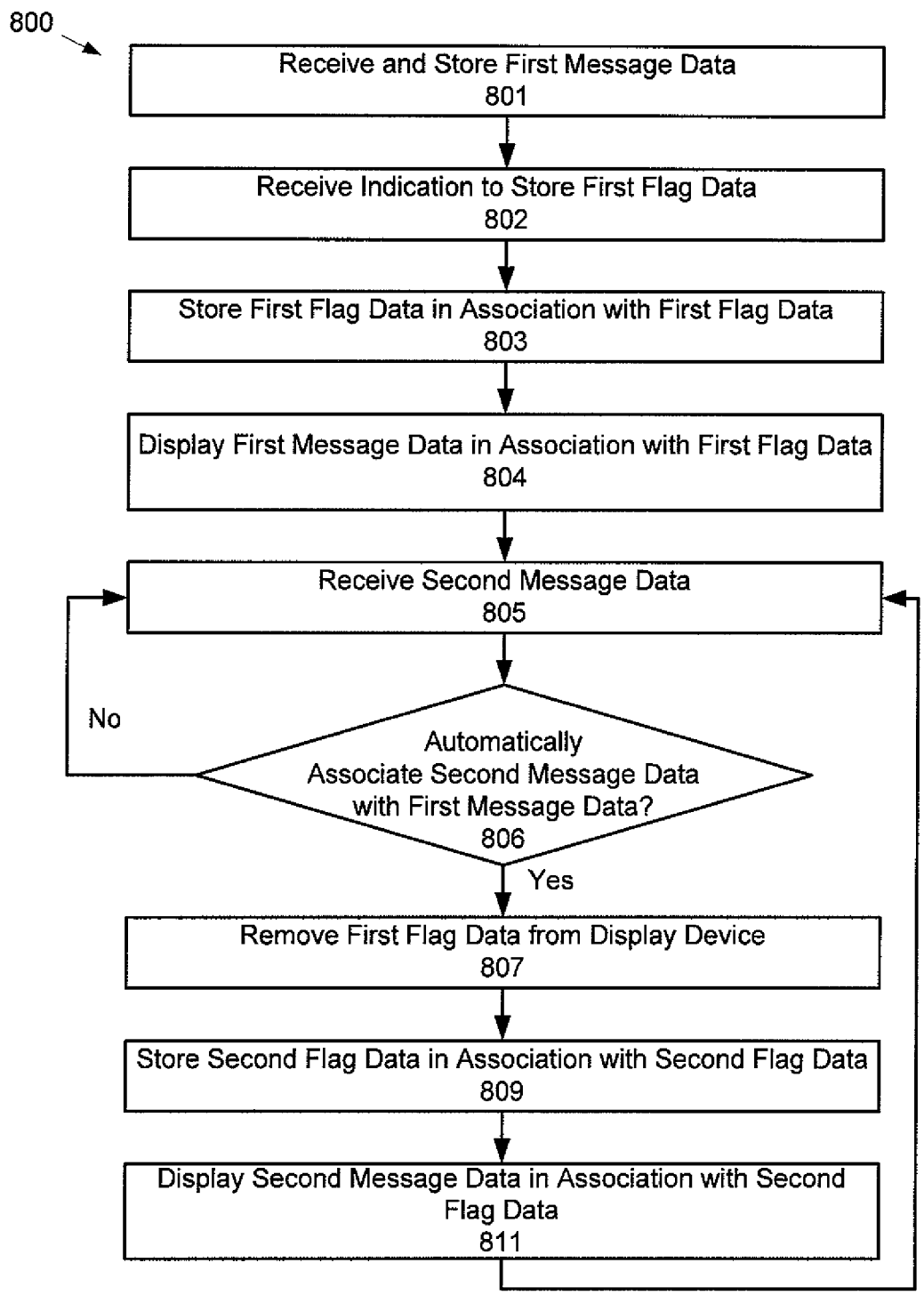
FIG. 8 depicts a flow chart of a method processing data, according to non-limiting embodiments.

Attention is now directed to FIG. 8 which depicts a method 800 for processing data on a computing device. In order to assist in the explanation of method 800, it will be assumed that method 800 is performed using system 100. Furthermore, the following discussion of method 800 will lead to a further understanding of system 100 and its various components. However, it is to be understood that system 100 and/or method 800 can be varied, and need not work exactly as discussed herein in conjunction with each other, and that such variations are within the scope of present embodiments.

At step 801, first message data 133 is received and stored. For example, first message data 133 can be received from computing device 135 via link 137, and stored in memory device 125.

At step 802 an indication that first flag data is to be stored in association with said first message data is received. For example, in some embodiments, the indication can comprise input data received from input device 126, the input data indicative that first message data 133 has been flagged, e.g. within messaging application 138, as described above. In other embodiments, the indication can comprise data received via another computing device in communication with computing device 101, e.g. in a client-server environment and/or as a remote command transmitted to computing device 101.

At step 803, first flag data 134 is stored in memory device 125 in association with first message data 133.

At step 804, first message data 133 is displayed in association with first flag data 134 at display device 128 in a message list view. For example, a representation (line 211 of FIG. 2) of first message data 133 can be displayed in association with a representation (e.g. icon 213) of first flag data 134 on display device 128 in the message list view such that first message data 133 is flagged in the message list view. Processing unit 122 can control display device 128 to provide the representations.

At step 805, second message data 333 is received, for example from computing device 135 via link 137 or from computing device 135a via link 137.

At step 806, it is determined whether to automatically associate second message data 333 with first message data 133. For example, processing unit 122 compares second message data 333 with first message data 133 and automatically associates them when at least one of: first message data 133 and second message data 333 comprise similar subject data; second message data 333 comprises at least a portion of first message data 133 (e.g. in a thread); first message data 133 and second message data 333 each comprise related metadata; and first message data 133 and second message data 333 belong to the same thread. If automatic association doesn't occur, steps 805 and 806 can be repeated when further message data is received (e.g. further message data 533).

Otherwise, in response to automatically associating first message data 133 and second message data, steps 807 to 811 occur, described hereafter.

At step 807, first flag data 134 is removed from display device 128 (e.g. icon 213 is removed from representation 140). In some embodiments, first flag data 134 can be deleted from memory device 125.

At step 809, second flag data 334 is stored in association with second message data 333 in memory device 125.

At step 811, second message data 333 is be displayed on display device 128 in association with second flag data 334 in a message list view, second message data 333 flagged on display device 128 rather than first message data 133. For example, a representation of second message data 333 is displayed in association with a representation of second flag data 334 on display device 128 in the message list view, such that second message data 333 is flagged in the message list view, as depicted in FIG. 4.

Steps 807 to 811 can occur in any suitable order. For example, in some embodiments, steps 804 and 811 can occur after step 809 in embodiments where message data is received and stored before the representations of the message data and flag data are provided (e.g. before messaging application 138 is processed or when messaging application 138 comprises a personal information manager (PIM), and other views are available within messaging application 138, such as a contact view; in these embodiments the storing and associating of flag data can occur in the background until messaging application 138 is switched to the message list view). In some of these embodiments, representations of first message data 133 and second message data 333 can be provided prior to steps 804 and 811, for example in embodiments where both first message data 133 and second message data 333 are received prior to storing and/or associating flag data, as depicted in FIG. 7.

In any event, steps 805-811 can be repeated when further message data 533 is received. For example, further message data 533 can be received at step 805 and a decision to automatically associate further message data 533 with first message data 133 can occur at step 806. In response to an automatic association occurring, any existing flag data associated with any message data associated with first message data 133 is removed from display device 128 at step 807, such as flag data 334/icon 413. At step 809, further flag data 534 is stored in association with further message data 533 in memory device 125. And at step 811, further message data 533 is displayed on display device 128 in association with further flag data 534 in the message list view. Hence, further message data 533 is then flagged on display device 128 rather than any other message data, as depicted in FIG. 6.

In some embodiments, method 800 can further comprise a step of synchronizing message data and flag data with another computing device. For example, computing device 101 can be synchronized with a portable electronic device, with message data being processable and viewable on each. Furthermore, method 800 can be implemented on one or both of computing device 101 and the portable electronic device. Hence, when first message data is flagged on one of computing device 101 and the portable electronic device, and the flag is moved at one of the devices when further message data associated with the first message data is received, according to method 800, then the flag data is synchronized with the other device such that movement of the flags occurs at both devices.

It is understood that automatically associating messages and flagging only the most recent message in a message list view when an earlier associated message in the message list view was previously flagged addresses a problem of efficiently using computer resources when processing data, and specifically message data. By flagging only the most recent of associated messages in a message list view, wasting resources in finding the most recent message is prevented. For example, the number of messages opened at the computing device can be reduced. In particular, when such a feature is implemented on a portable electronic device, which generally has a limited display screen size and computing resources, efficiently finding the most recent message in a thread in a message list view can save a lot of time, computing resources and further wear and tear on the device: for example, if a pointing device is used to scroll through messages, the amount of clicking and pointing is reduced, placing less stress on the scrolling device.

Those skilled in the art will appreciate that in some embodiments, the functionality of computing device 101 can be implemented using pre-programmed hardware or firmware elements (e.g., application specific integrated circuits (ASICs), electrically erasable programmable read-only memories (EEPROMs), etc.), or other related components. In other embodiments, the functionality of computing device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM (compact disc read only memory), ROM (read only memory), fixed disk, USB (Universal Serial Bus) drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for processing data on a computing device, said computing device comprising a processing unit interconnected with a memory device and a display device, said method comprising:

storing a first message received at said computing device in said memory device;

receiving input data that said first message is to be flagged for follow-up, and, in response:

storing first flag data in said memory device in association with said first message; and, displaying said first message in association with said first flag data at said display device in a message list view, said first flag data displayed as an icon adjacent said first message in said message list view, wherein said message list view arranges all messages sequentially based on time of receipt and regardless of whether the messages belong to a same message thread; and, receiving, at said processing unit, a second message in a same message thread as said first message; and, in response:

storing second flag data in association with said second message in said memory device;

displaying said second message in association with said second flag data at said display device in said message list view by moving said icon from said first message to adjacent said second message so that said second message is flagged on said display device rather than said first message; and, maintaining an order of messages in said message list view such that said order of any intervening messages received between said first message and said second message is maintained.

2. The method of claim 1, wherein, moving said icon comprises deleting said icon adjacent said first message and rendering said icon adjacent said second message in said message list view.

3. The method of claim 1, wherein said second message comprises a last received message in said same message thread as said first message.

4. The method of claim 1, further comprising synchronizing messages and flag data with a second computing device.

5. The method of claim 1, wherein said computing device comprises a portable electronic device.

6. A computing device for processing data, said computing device comprising:

a processing unit interconnected with a memory device, a display device, and a communication interface, said processing unit configured to:

store a first message received at said computing device in said memory device;

receive input data that said first message is to be flagged for follow-up, and, in response:

store first flag data in said memory device in association with said first message; and, control said display device to display said first message in association with said first flag data in a message list view, said first flag data displayed as an icon adjacent said first message in said message list view, wherein said message list view arranges all messages sequentially based on time of receipt and regardless of whether the messages belong to a same message thread; and, receive a second message in a same message thread as said first message via said communication interface; and, in response, store second flag data in association with said second message in said memory device;

display said second message in association with said second flag data at said display device in said message list view by moving said icon from said first message to adjacent said second message so that so that said second message is flagged on said display device rather than said first message; and maintain an order of messages in said message list view such that said order of any intervening messages received between said first message and said second message is maintained.

7. The computing device of claim 6, wherein said processor is further configured to move said icon by:

deleting said icon adjacent said first message and rendering said icon adjacent said second message in said message list view.

8. The computing device of claim 6, wherein said second message comprises a last received message in said same message thread as said first message.

9. The computing device of claim 6, wherein said processing unit is further configured to synchronize messages and flag data with a second computing device.

10. The computing device of claim 6, wherein said computing device comprises a portable electronic device.

11. A non-transitory computer-readable medium storing a computer program, wherein execution of the computer program is for, at a computing device comprising a processing unit interconnected with a memory device and a display device:

storing a first message received at said computing device in said memory device;

receiving input data that said first message is to be flagged for follow-up, and, in response:

storing first flag data in said memory device in association with said first message; and, displaying said first message in association with said first flag data at said display device in a message list view, said first flag data displayed as an icon adjacent said first message in said message list view, wherein said message list view arranges all messages sequentially based on time of receipt and regardless of whether the messages belong to a same message thread; and, receiving, at said processing unit, a second message in a same message thread as said first message; and, in response:

storing second flag data in association with said second message in said memory device;

displaying said second message in association with said second flag data at said display device in said message list view by moving said icon from said first message to adjacent said second message so that said second message is flagged on said display device rather than said first message; and, maintaining an order of messages in said message list view such that said order of any intervening messages received between said first message and said second message is maintained.

* * * * *